United States Patent [19]

Murofushi

[11] Patent Number: 4,879,482
[45] Date of Patent: Nov. 7, 1989

[54] LINEAR PULSE MOTOR

[75] Inventor: Masanori Murofushi, Tokyo, Japan

[73] Assignee: NEC Corporation, Tokyo, Japan

[21] Appl. No.: 213,864

[22] Filed: Jun. 30, 1988

[30] Foreign Application Priority Data

Jun. 30, 1987 [JP] Japan ................................. 62-164258
Jun. 30, 1987 [JP] Japan ................................. 62-164259
Jun. 30, 1987 [JP] Japan ................................. 62-164260
Jun. 30, 1987 [JP] Japan ................................. 62-164261
Jun. 30, 1987 [JP] Japan ................................. 62-164263

[51] Int. Cl.$^4$ .......................................... H02K 41/03
[52] U.S. Cl. ...................................... 310/12; 318/135; 360/78.13
[58] Field of Search ......................... 310/12; 360/78.13; 318/135

[56] References Cited

U.S. PATENT DOCUMENTS 4,578,622  3/1986  Nakagawa et al. ................... 310/12

FOREIGN PATENT DOCUMENTS 0068608  4/1982  Japan ..................................... 310/12
0103561  6/1984  Japan ..................................... 310/12
0162469  8/1985  Japan ..................................... 310/12
0162470  8/1985  Japan ..................................... 310/12

Primary Examiner—Patrick R. Salce
Assistant Examiner—Judson H. Jones
Attorney, Agent, or Firm—Sughrue, Mion, Zinn, Macpeak & Seas

[57] ABSTRACT

A linear pulse motor includes a stationary body, a guide member, adjusting members, and a movable body. The stationary body includes a projecting portion in which magnetic pole members are disposed, and a flat portion which surrounds the projecting portion. The magnetic pole members have a number of teeth arranged in an array in a first direction. The guide member is provided on the flat portion of the stationary body and has a guide groove extending in the first direction. The adjusting members serve to adjust a position of the guide member by moving the guide member in directions parallel and perpendicular to the flat portion. The movable body is provided above the guide member through a locatable member which is engaged with the guide groove. The movable body includes a number of teeth which are arranged in an array in the first direction and positioned to face the teeth of stationary body at a spacing therefrom.

26 Claims, 6 Drawing Sheets

STEP 1

STEP 2

STEP 3

STEP 4

4,879,482

LINEAR PULSE MOTOR

BACKGROUND OF THE INVENTION

The present invention relates to a linear pulse motor and, more particularly, to a linear pulse motor suitable for a drive mechanism which is adapted to position a magnetic head at a destination track.

A linear pulse motor is used to move, for example, a magnetic head or an optical head linearly in a radial direction of a magnetic disk or an optical disk until the head reaches a destination track of the disk.

A linear pulse motor for such an application is disclosed in U.S. Pat. No. 4,578,622 patented Mar. 25, 1986 and issued to Nakagawa et al, especially in FIGS. 6 to 10 thereof. The linear pulse motor disclosed in the Patent includes a stationary body including four magnetic pole members and a movable body (secondary body) which is slidable linearly on and along the stationary body. A pair of first and second guide members are located at opposite sides of magnetic pole teeth of the stationary member to guide the movable body during the linear movement of the latter. While the first guide member is securely connected to the stationary body by rivets, the second guide member is allowed to move in a direction perpendicular to its lengthwise direction by the rivets and a leaf spring. The guide members are individually provided with ball guide portions each receiving a ball therein. The balls roll in the individual ball guide portions to cause the movable body to slide on the stationary body. A permanent magnet for applying a magnetic field to the teeth of the stationary body is located below the teeth. Further, a pair of magnetic core frames are juxtaposed to the permanent magnet to selectively cancel the magnetic field to thereby move the movable body, a coil being wound around each of the core frames.

In the conventional linear pulse motor described above, the movable body is linearly displaceable with the first guide member which is rigid on the stationary body serving as a reference. A prerequisite with such a structure is that the first guide member be accurately positioned on the stationary body by rivetting to insure accurate parallelism between the teeth of the stationary body and those of the movable body. However, since machining the magnetic pole members and first guide member with extreme accuracy is difficult, the teeth of the stationary body and those of the movable body fail to become parallel to each other. In such a condition, the static torque of the movable body changes depending upon the position where the movable body is stopped.

Further, in the conventional linear pulse motor, the dimension of a gap defined between the teeth of the stationary body and those of the movable body is determined by the four balls which roll on the four separate magnetic pole members. Hence, any error in the assembly of the magnetic pole members prevents a uniform gap from being defined between the teeth of the stationary body and those of the movable body in the lengthwise direction of the teeth.

SUMMARY OF THE INVENTION

It is therefore an object of the present invention to provide a linear pulse motor in which teeth of a stationary body and those of a movable body are positioned parallel to each other with accuracy.

It is another object of the present invention to provide a linear pulse motor in which a uniform gap is defined between teeth of a stationary body and those of a movable body.

It is another object of the present invention to provide a linear pulse motor which allows dimensional errors of individual structural parts and elements to be compensated for during assembly.

A linear pulse motor of the present invention comprises: a stationary body having a projecting portion in which magnetic pole members are disposed, and a flat portion surrounding the projecting portion, said magnetic pole members having a plurality of first teeth arranged in an array in a first direction; a guide member provided on the flat portion of the stationary member and having a guide groove extending in the first direction; adjusting members for adjusting a position of the guide member by moving the guide member in directions parallel to and perpendicular to the flat portion; and a movable body provided above the guide member through a rotatable member which is engaged with the guide groove, the movable body having a plurality of second teeth which are arranged in an array in the first direction and positioned to face the first teeth at a spacing from the first teeth.

BRIEF DESCRIPTION OF THE DRAWINGS

The above and other objects, features and advantages of the present invention will become more apparent from the following detailed description taken in conjunction with the accompanying drawings in which.

In the entire drawings, the same reference numerals denote the same structural elements.

DESCRIPTION OF THE PREFERRED EMBODIMENT

Figure 1:
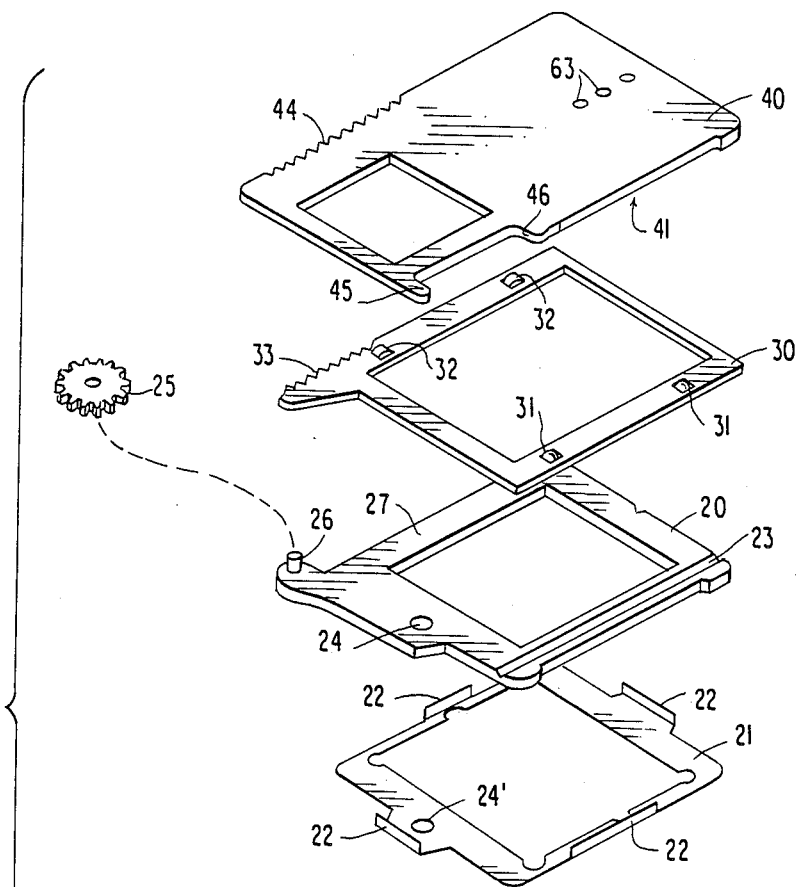
FIG. 1 is an exploded perspective view of an embodiment of the present invention.
Figure 1:
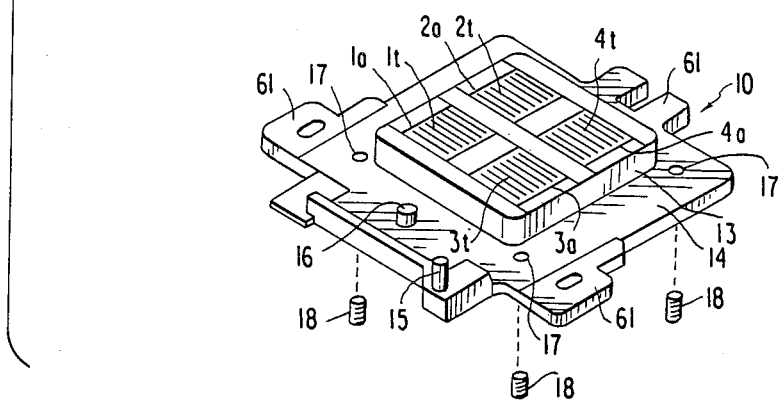

Referring to FIG. 1, a linear pulse motor in accordance with the present invention includes a stationary body 10 having four magnetic pole members 1a to 4a which are provided with teeth 1t to 4t on upper surfaces thereof, respectively. Specifically, the magnetic pole members 1a to 4a are received in a generally rectangular projecting portion 13 which is provided in a central part of the stationary body 10. All the teeth 1t to 4t of the magnetic pole members 1a to 4a extend parallel to each other and have the same pitch, width and height. Extensions of the tops of the teeth 1t and 2t are aligned with the tops of the teeth 3t and 4t, respectively. The teeth 1t and 3t are deviated from the teeth 2t and 4t by one half of the pitch, respectively. The upper surface of the projecting portion 13 has the same height as the tops of the teeth 1t to 4t. To prevent the entry of dust and other impurities, a resin or like material is buried in the bottoms of the teeth 1t to 4t. The projecting portion 13 is surrounded by a flat portion 14. A pin 15 for restricting the movable range of a movable body 40 is studded on a corner of the flat portion 14. Four screw holes 17 are formed through the flat portion 14 near the four corners in the vicinity of the projection 13.

Figure 2:
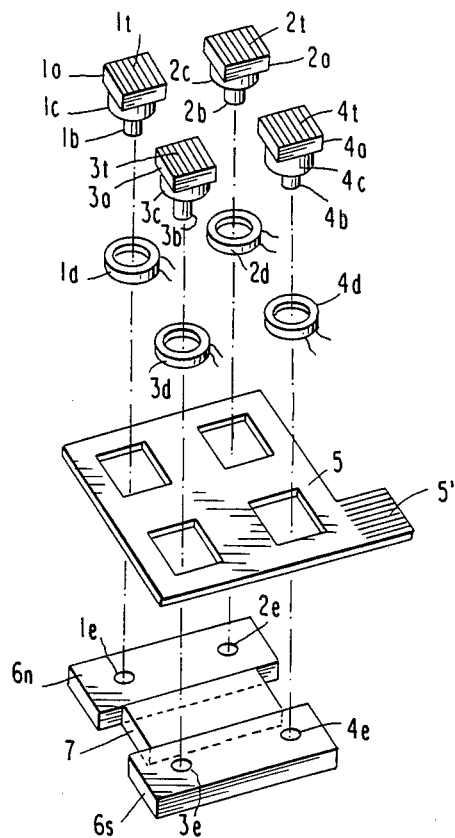
FIG. 2 is an exploded perspective view of a stationary body included in the embodiment.

Details of the stationary body 10 will be described with reference to FIG. 2. Iron cores 1b to 4b extend from the lower surface of the magnetic pole members 1a to 4a, respectively. Bobbins 1c to 4c are made of nylon or similar insulative material and coupled around the iron cores 1b to 4b, respectively. Coils 1d and 4d are wound counterclockwise around the bobbins 1c and 4c, respectively. Coils 2d and 3d are wound clockwise around the bobbins 2c and 3c, respectively. The coils 1d and 2d are connected in series by a flexible printed circuit board 5, and the coils 3d and 4d are also connected in series by the circuit board 5. The circuit board 5 includes a connecting section 5' which is provided with four drive current input terminals. The iron cores 1b to 4b are received in holes 1e to 4e, respectively, which are formed in iron yokes 6n and 6s via windows of the circuit board 5, thereby being magnetically connected to the yokes 6n and 6s. A permanent magnet 7 is interposed between the yokes 6n and 6s and has the N- and S-poles on the yoke 6n side and the yoke 6s side, respectively.

After the various parts of the stationary body 10 described above have been assembled together, the subassembly is subjected to molding which uses plastics or, preferably, unsaturated polyester containing glass fibers to have the configuration of FIG. 1 which includes the projecting portion 13 and the flat portion 14. The teeth 1t to 4t are then formed on the upper surface of the magnetic pole members 1a to 4a by cutting or etching.

Referring again to FIG. 1, a frame-like guide member 20 is made of aluminum and formed with a window in a central part thereof. A space spring 21 made of phosphor bronze is also formed with a window in its central part and fitted to the lower surface of the guide member 20 by its mounting portions 22. The guide member 20 is provided with a groove 23 having a generally V-shaped cross-section at one of opposite sides thereof and a flat portion 27 at the other side. A pin 26 for mounting a gear 25 is studded on one corner of the guide member 20. The guide member 20 with the space spring 21 rests on the flat portion 14 of the stationary body 10. In this condition, openings 24 and 24' formed through the guide member 20 and the space spring 21, respectively, are mated with the pin 16.

In such an arrangement, the guide member 20 is rotatable about the pin 16 so that the lengthwise direction of the V-shaped groove 23 may become perpendicular to the teeth 1t to 4t of the magnetic pole members 1a to 4a. The level or height of the guide member 20 is adjustable by four screws 18 inserted through the holes 17. After the guide member 20 has been adjusted in the two different directions by a method which will be described, the guide member 20 is securely fixed to the flat portion 14 of the stationary body 10 by using a resin which hardens when illuminated by ultraviolet rays.

Figure 3:
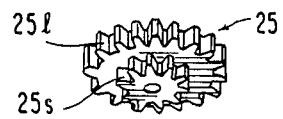
FIG. 3 is a perspective view of a gear included in the embodiment.

A retainer 30 is made of polyacetar and configured into a frame having a window. The retainer 30 is mounted on and slidable along the upper surface of the guide member 20. Specifically, balls 31 are rotatably buried in one side of the retainer 30 to be received in the V-shaped groove 23 of the guide member 20, and cylindrical rollers 32 are rotatably buried in the other side of the retainer 30 to be located on the flat portion 27 of the guide member 20. The retainer 30 is provided with a rack 33 on that side thereof where the rollers 32 are provided. As is shown in FIG. 3, the gear 25 is made up of a larger gear 25l and a smaller gear 25s which are coaxial with each other, the rack 33 being meshed with the smaller gear 25s.

Figure 4:
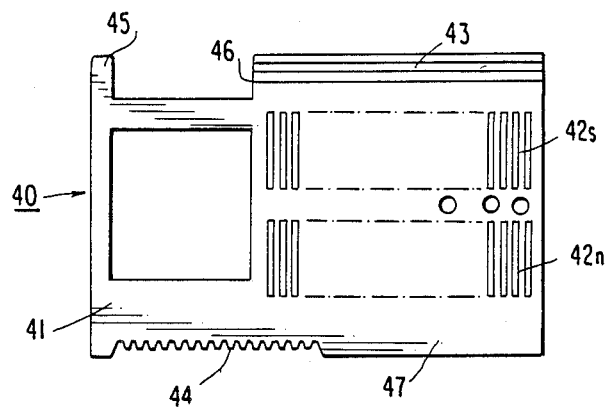
FIG. 4 is a plan view of a movable body included in the embodiment.

Referring also to FIG. 4, a movable body 40 made of malleable iron is formed with two arrays of teeth 42n and 42s on the lower surface 41 thereof (i.e. the surface which faces the magnetic pole members 1a to 4a) by photoetching. While tooth arrays 42n and 42s have the same pitch and width as the teeth 1t to 4t, they are deviated by one fourth of the pitch (one half of the tooth width) from each other. The tooth arrays 42n and 42s face the magnetic pole members 1a and 2a and the magnetic pole members 3a and 4a, respectively. A groove 43 having a generally V-shaped cross-section extends in one side portion of the lower surface 41 of the movable body 40, the other side portion of the lower surface 41 being formed as a flat portion 47. The groove 43 is adapted to receive the balls 31. The movable body 40 is provided with a rack 44 which has the same pitch as the rack 33 and meshes with the larger gear 25l. A corner portion of the movable body 40 is shaped into a lug 45 and an abutment 46 which are selectively engageable with the pin 15.

Figure 5:
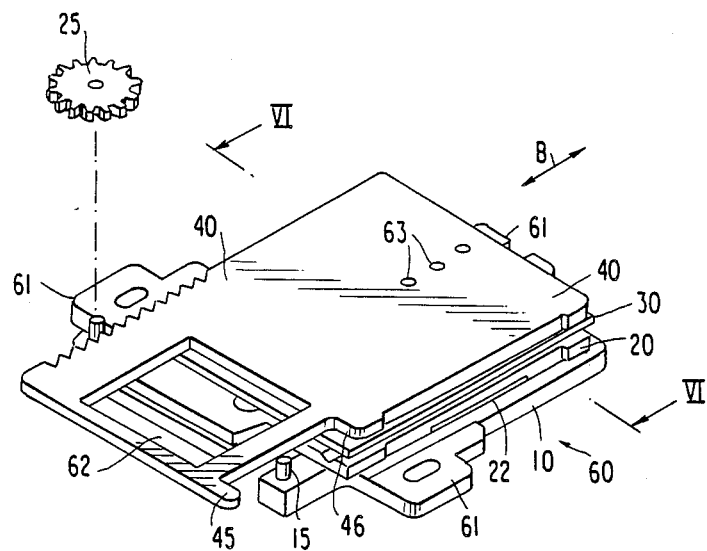
FIG. 5 is a perspective view of the embodiment of the invention.

As is shown in FIG. 5, the movable body 40 made of malleable iron is attracted toward the stationary body 10 through he retainer 30 by the force of the magnet 7. At this instant, the teeth 1t to 4t face the teeth provided on the lower surface 41 of the movable body 40 at a spacing of 30 μm. The movable body 5 is movable on and along the guide member 20 in a direction indicated by a double-headed arrow B because the balls 31 roll in the V-shaped groove 23 and 43 and the rollers 32 roll on the flat portions 27 and 47. Such a displacement of the movable body 40 is restricted by the pin 15 against which the lug 45 and abutment 46 are engageable. The retainer 30 is movable in the same direction as the movable body 40 by one half of the stroke of the movable body 40. The larger gear 25l meshed with the rack 44 of the movable body 40 has two times greater number of teeth than the smaller gear 25s which is meshed with the rack 33 of the retainer 30. Hence, the positional relationship between the movable body 40 and the retainer 30 with respect to the direction B remains the same even if any slippage occurs between the channels 23 and 43 and the flat portions 27 and 47.

Figure 6:
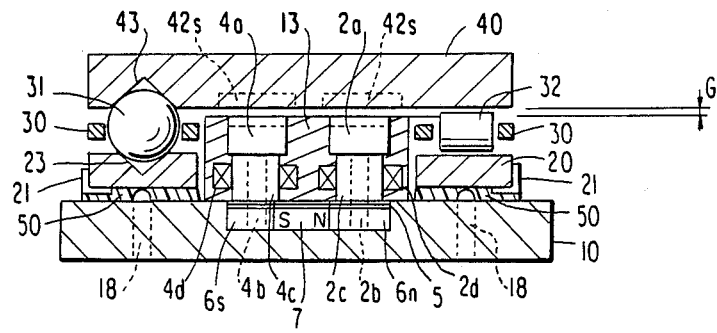
FIG. 6 is a sectional view taken along line VI—VI of FIG. 5.

Hereinafter will be described with reference to FIG. 6 how the gap G between the teeth 1t to 4t of the stationary body 10 and the teeth 42n and 42s of the movable body 40, and the parallelism of the two bodies 10 and 40 are adjusted.

The guide member 20 is positioned on the flat portion 14 of the stationary body 10 with the intermediary of the space spring 21, as previously described. When the retainer 30 is placed on the guide member 20 and then the movable body 40 on the retainer 30, a magnetic loop is completed which extends from the magnet 7 back to the magnet 7 via the yoke 6n, iron cores 1b and 2b, magnetic pole members 1a and 2a, movable body 40, magnetic pole members 3a and 4a, iron cores 3b and 4b, and yoke 6s. Hence, the surfaces of the teeth 42n and 42s of the movable body 40 are magnetically adhered to the magnetic pole members 1a to 4a. In this condition (the gap G being zero), the four screws 18 are individually inserted into the screw holes 17 from below and driven until their tips make contact with the lower surface of the guide member 20. Then, the screws 18 are rotated by the same amount as each other to rise by 30 μm so that the teeth 42n and 42s of the movable body 40 are uniformly spaced from the teeth 1t to 4t of the magnetic pole members 1a to 4a by 30 μm. After such adjustment of the gap G, the space spring 21 is provisionally fixed to the flat portion 14 of the stationary member 10 by flexible adhesive. At this stage of assembly, the guide member 20 and space spring 21 are still rotatable by a small amount about the pin 16.

Subsequently, the guide member 20 is rotated about the pin 16 until its groove 23 becomes perpendicular to the teeth 1t to 4t, thereby orienting the teeth 42n and 42s of the movable member 40 parallel to the teeth 1t to 4t. To promote more accurate adjustment, in the condition shown in FIG. 5, the movable member 40 may be moved at a constant speed in the direction B and the guide member 20 may be rotated around the pin 16 such that the current values due to electromotive forces which are generated in the coils 1d to 4d appear as sinusoidal waves which are different in phase by $\pi/4$ from each other. After this adjustment, a resin 50 of the kind hardening when illuminated by ultraviolet rays is filled in the space between the guide member 20 and the flat portion 14 of the stationary body 10 and then hardened by ultraviolet rays. As a result, the guide member 20 is rigidly connected to the flat portion 14 of the stationary body 10. In this manner, the parallelism and gap of the teeth 42n and 42s of the movable body 40 to the teeth 1t to 4t of the stationary body 10 are adjusted.

The operation of the linear pulse motor having the above construction will be described with reference to FIGS. 7A to 7D. Generally, the linear pulse motor is driven one step at a time by the repetition of STEPs 1 to 4 as shown in FIGS. 7A to 7D. The stationary body 10 and the movable body 40 are formed with teeth which have the same width and height and are arranged at the same pitch. In the illustrative embodiment, the pitch T is 0.75 mm, the width W is 0.375 mm, and the height H is 0.375 mm. As described above, the teeth 1t and 2t of the stationary body 10 are deviated by one half of the pitch from each other. Specifically, when the tops of the teeth 1t face the tops of the teeth 42n, the tops of the teeth 2t face the bottoms of the teeth 42n. This relation is also true with the teeth 3t, 4t and 42s. Further, the teeth 42n and 42s of the movable body 40 are deviated by one fourth of the pitch (one half of the width) from each other. In the following description, the direction as viewed from the left to the right in the figures is assumed to be the positive direction of current.

Figure 7A:
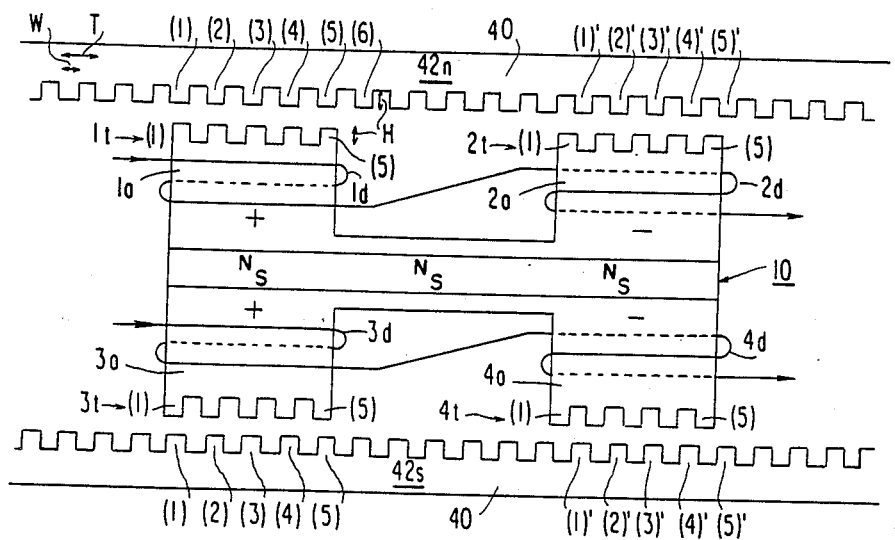
FIGS. 7A to 7D are diagrams schematically showing the operation of the embodiment shown in FIG. 5.

As shown in FIG. 7A, in STEP 1, a positive current is applied to the coils 1d to 4d. In this condition, upward magnetic flux as viewed in the figure is developed in the magnetic pole members 1a and 3a while downward magnetic flux is developed in the magnetic pole members 2a and 4a. Since the magnetic flux developed in each of the magnetic pole members 1a and 3a is the same in direction as the magnetic flux which is developed by the magnet 7, magnetic attraction occurs between the teeth 1t and 3t and the teeth 42n and 42s, respectively. On the other hand, the magnetic fluxes developed by the magnetic pole members 2a and 4a are opposite in direction to the magnetic flux of the magnet 7 and therefore cancel each other almost no magnetic attraction occurring between the teeth 2t and 4t and the teeth 42n and 42s, respectively.

As shown, the magnetic pole member 1a has teeth 1t-(1) to 1t-(5), the movable body 40 has teeth 42n-(1) to 42n-(5) which individually face the teeth 1t-(1) to 1t-(5), the magnetic pole member 3a has teeth 3t-(1) to 3t-(5), and the movable body 40 has teeth 42s-(1) to 42s-(5) which individually face the teeth 3t-(1) to 3t-(5). Then, a force acts on the teeth 42n-(1) to 42n-(5) which tends to magnetically urge them toward the teeth 1t-(1) to 1t-(5), respectively. As a result, a force tending to move the movable body 40 to the right as viewed in the figure is applied to the movable body 40. On the other hand, a force tending to magnetically urge the teeth 42s-(1) to 42s-(5) toward the teeth 3t-(1) to 3t-(5), respectively, acts on the teeth 42s-(1) to 42s-(5) resulting in the movable body 40 being urged to the left. The movable body 40 is brought to a halt at a position where the rightward and leftward urging forces balance with each other. More specifically, the movable body 40 is stopped at a position where the teeth 1t-(1) to 1t-(5) face the teeth 42n-(1) to 42n-(5) and the teeth 3t-(1) to 3t-(5) face the teeth 42s-(1) to 42s-(5) each over three fourths of the tooth width W.

Figure 7B:
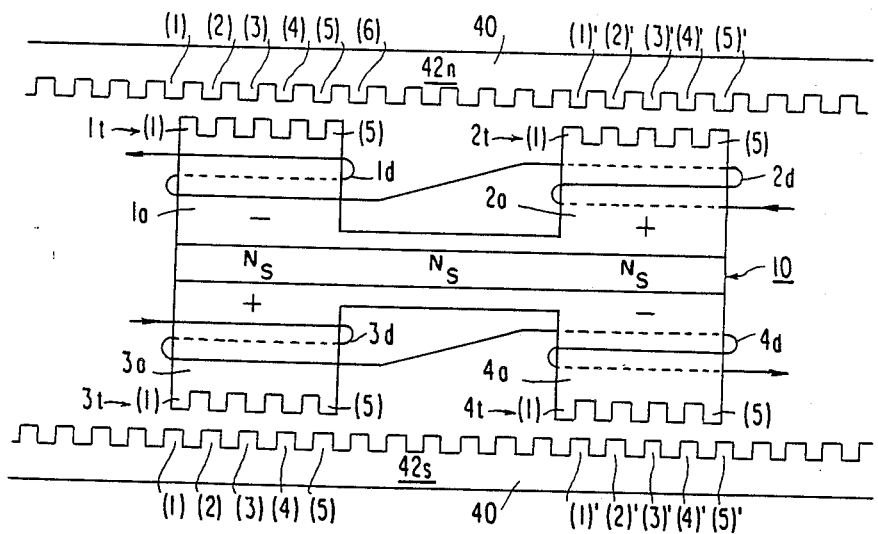

Next, in STEP 2 shown in FIG. 7B, a negative current is applied to the coils 1d and 2d while a positive current is applied to the coils 3d and 4d. The negative current reverses the direction of magnetic flux which is developed in the magnet pole members 1a and 2a and, therefore, the magnetic attraction between the teeth 1t and 42n is cancelled. At the same time, magnetic attraction occurs between the teeth 2t and 42n, and the magnetic attraction between the teeth 3t and 42s is maintained. The movable body 40 is brought to a stop when moved leftward to a position where the forces exerted by the magnet pole members 2a and 3a balance with each other. Specifically, teeth 42n-(1)' to 42n-(5)' are respectively attracted by the teeth 2t-(1) to 2t-(5) so that the movable body 40 is moved to the left. As the teeth 42s-(1) to 42s-(5) are moved to the left away from the teeth 3t-(1) to 3t-(5), the force tending to urge the teeth 42s-(1) to 42s-(5) toward the teeth 3t-(1) to 3t-(5) turns into a force which tends to move the movable body 40 to the right. At a position where the force exerted by the teeth 2t-(1) to 2t-(5) to urge the movable body 40 to the left and the force exerted by the teeth 3t-(1) to 3t-(5) to urge it to the right balance with each other, the movable body 40 is stopped. The movable body 40 is moved to the left by a distance of T/4 (=0.1875 mm), compared to the position of FIG. 7A (STEP 1).

Figure 7C:
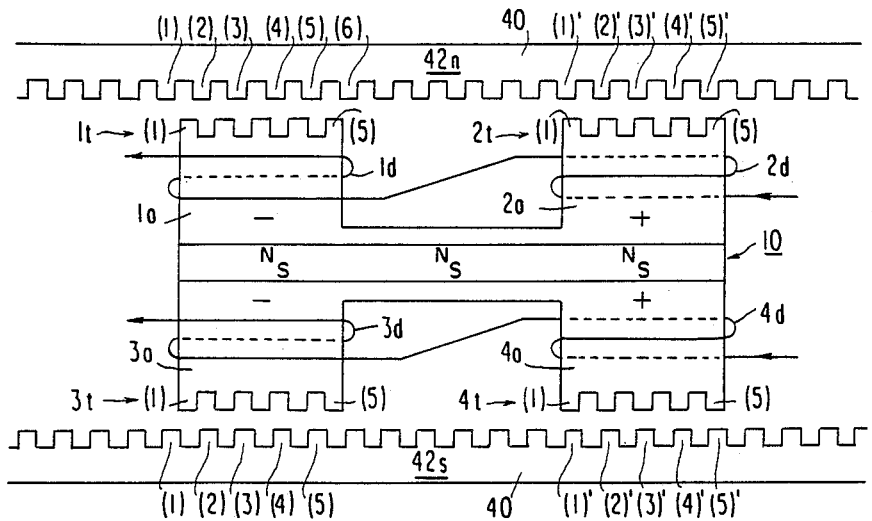

In STEP 3 shown in FIG. 7C, a negative current is applied to all of the coils 1d to 4d. In this condition, the magnetic force exerted by the magnetic pole member 3a is cancelled, and a magnetic force is exerted by the magnetic pole member 4a. The magnetic pole member 2a is exerting a magnetic force, as in STEP 2. The movable body 40 is brought to a stop after it has been moved further to the left to a position where the forces of the magnetic pole members 2a and 4a balance with each other. Specifically, the teeth 42s-(1)' to 42s-(5)' are respectively attracted by the teeth 4t-(1) to 4t-(5) to in turn move the movable body 40 to the left. As the teeth 42n-(1)' to 42n-(5)' are moved to the left past the teeth 2t-(1) to 2t-(5), the force exerted by the teeth 2t-(1) to 2t-(5) on the teeth 42n-(1)' to 42n-(5)' turns into a force which tends to urge the movable body 40 to the right.

The movable body 40 is stopped at a position where the force of the magnetic pole member 4a urging the movable body 40 to the left and the force of the magnetic pole member 2a urging it to the right balance with each other. The movable body 40 is moved further to the left by T/4, compared to the position of FIG. 7B.

Figure 7D:
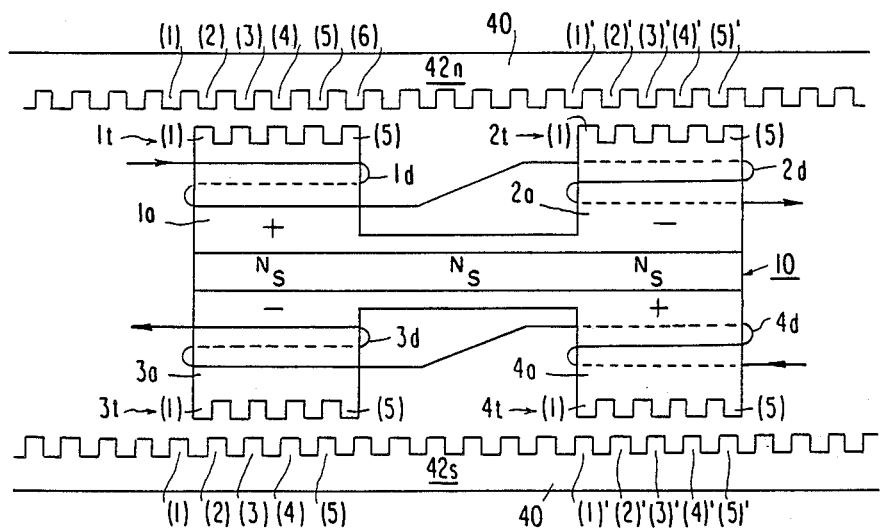

In STEP 4 shown in FIG. 7D, a positive current is applied to the coils 1d and 2d while a negative current is applied to the coils 3d and 4d, so that the magnetic pole members 1a and 4a each generates an attracting force. The movable body 40 is moved further to the left to a position where the forces of the magnetic pole members 1a and 4a balance with each other. Specifically, the teeth 1t-(1) to 1t-(5) respectively attract the teeth 42n-(2) to 42n-(6) to thereby move the movable body 40 to the left. When the teeth 42s-(1)' to 42s-(5)' are moved to the left past the teeth 4t-(1) to 4t-(5), the force exerted by the teeth 4t-(1) to 4t-(5) on the teeth 42s-(1)' to 42s-(5)' turns into a force which tends to move the movable body 40 to the right. The movable body 40 is stopped at a position where the force of the magnetic pole member 1a urging the movable body 40 to the left and the force of the magnetic pole member 4a urging it to the right balance with each other. The movable body 40 is moved further to the left by T/4, compared to the position of FIG. 7C. In this condition, the movable body 40 has been moved by $(\frac{3}{4})$T from the position shown in FIG. 7A.

Thereafter, the current shown in FIG. 7A is fed through the coils 1d to 4d again so as to move the movable body 40 to the left by T/4. STEPs 1 to 4 described above are repeated to move the movable member 40 to the left, i.e., the movable body 40 is moved by a distance of T by one cycle of consecutive STEPs 1 to 4. To move the movable body 40 to the right, the coils 1d to 4d will be driven by reversing the order of STEPs 1 to 4.

The linear pulse motor constructed and operated as stated above may be applied to a 3.5 inch floppy disk apparatus, as described hereinafter.

Turning back to FIG. 5, the stationary body 10 of the linear pulse motor 60 includes mounting sections 61 at opposite sides thereof, each mounting section 61 being formed with a screw hole. On the other hand, the movable body 40 includes an opening 62 for mounting a lower magnetic head and screw holes 63 for mounting a head assembly of an upper magnetic head.

Figure 8:
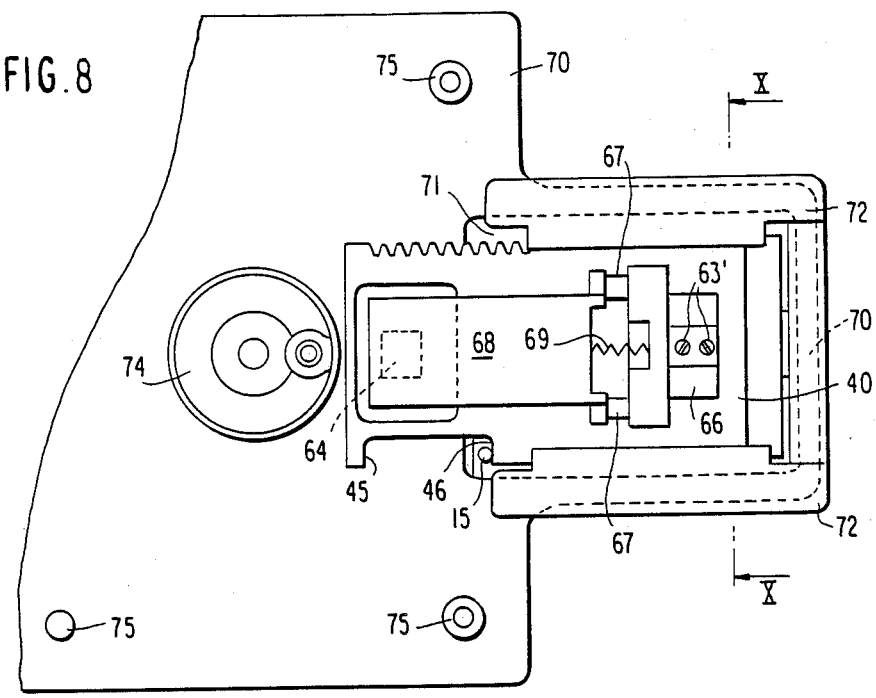
FIGS. 8 and 9 are a plan view and a side view showing a floppy disk drive which is implemented with the embodiment of FIG. 5.
Figure 9:
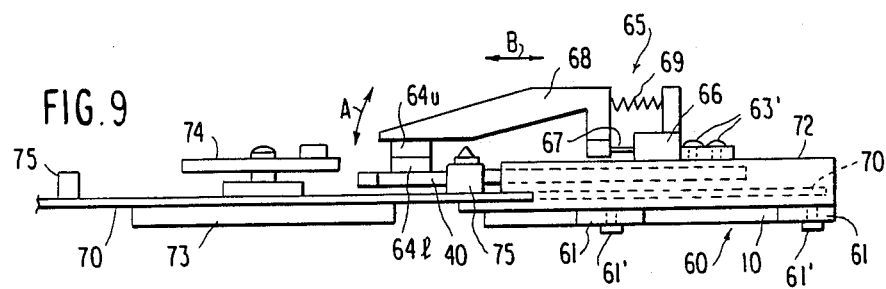
Figure 10:
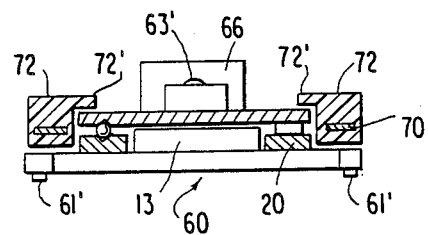
FIG. 10 is a sectional view taken along line X—X of FIG. 8.

Referring to FIGS. 8 to 10, a base plate 70 is made of iron and formed with an opening 71 for mounting the linear pulse motor 60. The opening 71 is surrounded by a plastics frame 72 which is formed by outser molding. The motor 60 is inserted into the opening 71 from the lower surface of the base plate 70 and fixed therein by screws 61' at the three mounting sections 61, the movable body 40 being located above the base plate 70. As best shown in FIG. 10, the frame 72 includes shoulders 72' which prevent the movable body 40 from being separated from the stationary body 10.

Disposed in the opening 62 is a lower magnetic head 64l which is supported by a gimbal spring (not shown). An upper magnetic head support assembly 65 is mounted on the upper surface of the movable body 40. The support assembly 65 includes a stationary block 66 which is securely mounted by screws 63' through the screw holes 63, and a movable arm 68 mounted to the stationary block 66 through two leaf springs 67. The movable arm 68 is constantly biased by a spring 69 counterclockwise as viewed in FIG. 9. An upper magnetic head 64u is mounted on the tip of the movable arm 68 and constantly biased toward the lower magnetic head 64l by the force of the spring 69. As well known in the art, the movable arm 68 is driven by a head load and unload mechanism in a direction indicated by a double-headed arrow A in FIG. 9, moving the upper head 64u toward and away from the lower head 64l.

A spindle motor (FIG. 9) is mounted on the underside of the base plate 70. An output shaft of the spindle motor protrudes from the upper surface of the base plate 70 to be engaged with a spindle hub 74. The spindle hub 74 is adapted to mate with and rotate a floppy disk when the disk is attached in the apparatus. The base plate 70 is formed with projections 75 by outsert molding for determining the height position of the floppy disk in engagement with a casing of the disk.

When the linear pulse motor 60 is driven, the upper and lower magnetic heads 64l and 64u are moved in direction indicated by B to be positioned at a desired track. Since the minimum pitch of movement of the movable body 40 is 0.1875 mm, the track pitch is also 0.1875 mm. The position where the lug 45 of the movable body 40 abuts against the pin 15 and is stopped thereby coincides with a zero-th track.

In the floppy disk apparatus shown and described, the spindle hub 74 and linear pulse motor 60 are directly mounted on the base plate 70. This allows the height at which a floppy disk mates with the spindle hub 74 and the height of the lower magnetic head 64 to be determined with accuracy. In addition, the extension of the linear movement of each of the heads 64l and 64u is accurately positioned on the center of rotation of the spindle hub 74.

What is claimed is:

1. A linear pulse motor comprising:
    a stationary body having a projecting portion in which magnetic pole members are disposed, and a flat portion surrounding said projecting portion, said magnetic pole members having a plurality of first teeth arranged in an array in a first direction;
    a guide member provided on said flat portion of said stationary body and having a first guide groove extending in said first direction;
    adjusting members for adjusting a position of said guide member by moving said guide member in directions parallel to and perpendicular to said flat portion; and
    a movable body provided above said guide member through a rotatable member which is engaged with said first guide groove, said movable body having a plurality of second teeth which are arranged in an array in said first direction and positioned to face said first teeth at a spacing from said first teeth.

2. A linear pulse motor as claimed in claim 1, wherein said guide member comprises:
    a first guide portion having said guide groove; and
    a first second guide portion spaced apart from said first guide portion in a second direction perpendicular to the first direction and having a flat portion which extends in said first direction.

3. A linear pulse motor as claimed in claim 2, wherein said rotatable member comprises balls, said motor further comprising cylindrical rollers interposed between said flat portion of said second guide portion and said movable body.

4. A linear pulse motor as claimed in claim 1, further comprising a retainer member interposed between said guide member and said movable body for retaining said rotatable member.

5. A linear pulse motor as claimed in claim 1, wherein said first teeth are made up of a first array and a second array which are spaced apart from each other in a second direction perpendicular to said first direction, said second teeth comprising a third and a fourth array which face said first array and said second array, respectively.

6. A linear pulse motor as claimed in claim 5, wherein tops and bottoms of said first and second array of said first teeth are aligned in said first direction, and tops and bottoms of said third and fourth array of said second teeth are deviated from each other by one fourth of a tooth pitch in said first direction.

7. A linear pulse motor as claimed in claim 1, wherein said adjusting members include first adjusting members for adjusting said guide member in the direction perpendicular to said flat portion, and second adjusting members for adjusting said guide members in the direction parallel to said flat portion, said first adjusting members comprising a pin disposed on said stationary member, and a first opening provided in said guide member, said pin and said first opening being positioned such that said pin is mated with said first opening, thereby allowing said guide member to be moved in the direction perpendicular to said flat portion, said second adjusting members comprising a second opening provided in said stationary body, and a screw insertable through said second opening for contacting the lower surface of said guide member, thereby lifting said guide member in a direction parallel to said flat portion.

8. A linear pulse motor as claimed in claim 1, further comprising a space spring disposed between said guide member and said stationary body.

9. A linear pulse motor as claimed in claim 2, wherein said movable body includes a third guide portion having a second guide groove, said rotatable member being engaged with said second guide groove, and a fourth guide portion spaced apart from said third guide portion in the second direction, said guide portion having a second flat portion which extends in said first direction.

10. A linear pulse motor as claimed in claim 1, wherein said guide member includes gear means, and wherein said movable body includes first rack means and said retainer includes second rack means.

11. A linear pulse motor as claimed in claim 10, wherein said gear means comprises a first gear and a second gear, said first and second gear being coaxial with each other and said first gear being larger than said second gear, said first rack means being meshed with said second gear, and said second rack means being meshed with said first gear.

12. A linear pulse motor as claimed in claim 1, wherein said stationary body includes means for limiting the movable range of said movable body.

13. A linear pulse motor as claimed in claim 12, wherein said limiting means comprises a pin, and wherein said movable body includes a lug portion disposed at one end thereof, and an abutment space from said lug portion, said lug portion and said abutment portion each being engagable with said pin, thereby limiting the movement of said movable body by an amount defined by the space between said lug portion and said abutment portion.

14. A disk driving apparatus including a linear pulse motor for moving a transducer head in a radial direction of a rotating disk so that said transducer head reads or records information from or to a surface of said rotating disk, wherein said linear pulse motor comprises:

a stationary body having a projecting portion in which magnetic pole members are disposed, and a flat portion surrounding said projecting portion, said magnetic pole members having a plurality of first teeth arranged in an array in a first direction;

a guide member provided on said flat portion of said stationary body and having a first guide groove extending in said first direction;

adjusting members for adjusting a position of said guide member by moving said guide member in directions parallel to and perpendicular to said flat portion; and a movable body provided above said guide member through a rotatable member which is engaged with said first guide groove, said movable body having a plurality of second teeth which are arranged in an array in said first direction and positioned to face said first teeth at a spacing from said first teeth.

15. A disk driving apparatus as claimed in claim 14, wherein said guide member comprises:

a first guide portion having said guide groove; and a second guide portion spaced apart from said first guide portion in a second direction perpendicular to the first direction and having a first flat portion which extends in said first direction.

16. A disk driving apparatus as claimed in claim 15, wherein said rotatable member comprises balls, said apparatus further comprising cylindrical rollers interposed between said flat portion of said second guide portion and said movable body.

17. A disk driving apparatus as claimed in claim 14, further comprising a retainer member interposed between said guide member and said movable body for retaining said rotatable member.

18. A disk driving apparatus as claimed in claim 14, wherein said first teeth are made up of a first array and a second array which are spaced apart from each other in a second direction perpendicular to said first direction, said second teeth comprising a third and a fourth array which face said first array and said second array, respectively.

19. A disk driving apparatus as claimed in claim 18, wherein tops and bottoms of said first and second array of said first teeth are aligned in said first direction, and tops and bottoms of said third and fourth array of said second teeth are deviated from each other by one fourth of a tooth pitch in said first direction.

20. A disk driving apparatus as claimed in claim 14, wherein said adjusting members include first adjusting members for adjusting said guide member in the direction perpendicular to said flat portion, and second adjusting members for adjusting said guide members in the direction parallel to said flat portion, said first adjusting members comprising a pin disposed on said stationary member, and a first opening provided in said guide member, said pin and said first opening being positioned such that said pin is mated with said first opening, thereby allowing said guide member to be moved in the direction perpendicular to said flat portion, said second adjusting members comprising a second opening provided in said stationary body, and a screw insertable through said second opening for contacting the lower surface of said guide member, thereby lifting said guide member in a direction parallel to said flat portion.

21. A disk driving apparatus as claimed in claim 14, further comprising a space spring disposed between said guide member and said stationary body.

22. A disk driving apparatus as claimed in claim 15, wherein said movable body includes a third guide portion having a second guide groove, said rotatable member being engaged with said second guide groove, and a fourth guide portion spaced apart from said third guide portion in the second direction, said guide portion having a second flat portion which extends in said first direction.

23. A disk driving apparatus as claimed in claim 14, wherein said guide member includes gear means, and wherein said movable body includes first rack means and said retainer includes second rack means.

24. A disk driving apparatus as claimed in claim 23, wherein said gear means comprises a first gear and a second gear, said first and second gear being coaxial with each other and said first gear being larger than said second gear, said first rack means being meshed with said second gear, and said second rack means being meshed with said first gear.

25. A disk driving apparatus as claimed in claim 14, wherein said stationary body includes means for limiting the movable range of said movable body.

26. A disk driving apparatus as claimed in claim 25, wherein said limiting means comprises a pin, and wherein said movable body includes a lug portion disposed at one end thereof, and an abutment space from said lug portion, said lug portion and said abutment portion each being engagable with said pin, thereby limiting the movement of said movable body by an amount defined by the space between said lug portion and said abutment portion.

* * * * *